United States Patent [19]
Cundiff

[11] Patent Number: 6,091,525
[45] Date of Patent: Jul. 18, 2000

[54] SPECTRAL MONITORING DEVICE AND METHOD USING DATA CORRELATION FOR WDM SYSTEMS

[75] Inventor: Steven Thomas Cundiff, Boulder, Colo.

[73] Assignee: Lucent Technologies Inc., Murray Hill, N.J.

[21] Appl. No.: 08/978,722

[22] Filed: Nov. 26, 1997

[51] Int. Cl.[7] .............................. H04B 10/08; H04J 14/08
[52] U.S. Cl. ........................... 359/130; 359/110; 359/140
[58] Field of Search .................................... 359/110, 130, 359/140, 161

[56] References Cited

U.S. PATENT DOCUMENTS 5,915,052 6/1999 Ball ........................................... 385/24

*Primary Examiner*—Jason Chan
*Assistant Examiner*—Dalzid Singh

[57] ABSTRACT

A method and device for monitoring of the plural discrete wavelengths which carry data channels in a WDM optical signal. An input fiber provides a WDM optical signal to a splitter for dividing the signal into two portions. The first portion is provided to a dispersive delay line for delaying, in a temporally staggered manner, the channels of the WDM signal, following which the staggered signal is provided to an optic detector and converted to a first resulting electrical signal. The second portion of the WDM signal is either first converted to an electric signal and then provided to an adjustable electronic delay for delaying all components in the electrical signal by the same delay interval to produce a second resulting electrical signal, or is first provided to an adjustable optical delay for delaying the channels in the second portion by the same delay interval and then converting the delayed signal to the second resulting electrical signal. Finally, the first and second resulting optical signals are mixed together for various delay times of the electronic delay or optical delay and the results of the mixing of the signals are averaged by an integrator to obtain an output signal indicative of characteristics of the discrete wavelengths of the WDM optical signal.

18 Claims, 3 Drawing Sheets

SPECTRAL MONITORING DEVICE AND METHOD USING DATA CORRELATION FOR WDM SYSTEMS

BACKGROUND OF THE INVENTION

I. Field of the Invention

This invention pertains to optical communication systems wherein wavelength division multiplexed (WDM) optical signals having multiple wavelengths are transmitted through an optical medium. More particularly, the present invention relates to a method and device for monitoring of channels in a WDM optical signal.

II. Description of Related Art

In WDM optical communications systems, a WDM optical signal includes a plurality of discrete optical wavelengths or channels which can be modulated with data and transmitted through an optical medium such as an optic fiber. The modulated channels may carry data, for example, to downstream optical network units (ONUs) and used for various purposes. In such WDM optical systems, it is desirable to monitor the channels to obtain system operational data. For example, it is important to know whether a particular channel is on or off, and thus available for carrying a data signal; whether a particular channel has a desired power level; and whether a particular channel is at an appropriate wavelength, e.g. to determine whether drift has occurred.

Several devices and techniques exist for monitoring channels in a WDM optical system. For example, an optical spectral analyzer can be employed to measure spectrum characteristics. However, the use of such a device has several drawbacks. For example, spectral analyzers contain moving parts and are, therefore, susceptible to frequent breakdown and repair. Moreover, the units themselves are expensive and multiple units are required, e.g. one at each add/drop node in the optical network.

Optical gratings can also be used to monitor WDM signal channels. Such gratings angularly disperse the individual wavelengths in a multiple wavelength optical signal from each other whereupon the dispersed wavelengths can be received by detectors for monitoring channel characteristics. The operation of such gratings is more fully described in U.S. patent application Ser. No. 08/690,696 filed on Jul. 31, 1996 and entitled "Attenuation Device For Wavelength Multiplexed Optical Fiber Communications".

Another technique for monitoring WDM signal channels employs a wavelength selective delay to convert wavelengths into the time domain. Such a technique utilizes a modulator to form a pulse from all of the wavelengths in the multiple wavelength signal carried by a transmission optical fiber so that the formed pulse is comprised of wavelengths in all of the channels. The pulse is then processed by a dispersive delay line such as a continuously dispersive line (e.g. a length of single mode fiber) or a discrete delay line wherein discrete delays are provided to different wavelengths (e.g. a series of fiber Bragg gratings, each being reflective at a different wavelength). The amount of dispersion required depends on how short a pulse can be generated by the modulator. Thus, a lower limit is placed on the expense of this technique. For example, a cheap modulator will generate long pulses which, in turn, will require an expensive, large dispersive delay line for processing.

Accordingly, there exists a need for providing for monitoring of channels in a WDM signal using relatively low amounts of dispersion and avoiding the need for a modulator to form an optical pulse.

SUMMARY OF THE INVENTION

The present invention is directed to a device for monitoring of channels in WDM optical signal using data correlation. The device receives the WDM optical signal which is made up of channels or wavelengths having uncorrelated data bit streams that, in turn, are not correlated with other channels in the signal. The WDM signal is divided by a splitter and provided to first and second branches of the device. The first branch includes a dispersive delay line and an optical detector, and the second branch includes an optical detector and an electronic delay. The dispersive delay line is constructed to impart a differential delay to each channel with respect to the other channels such that an optical signal with staggered wavelength channels results in time-spaced channels. The staggered signal is provided to the detector in the first branch for conversion to a resulting electrical signal. The second branch includes a detector for converting the second portion of the WDM signal into an electrical signal. The electrical signal is then provided to an adjustable electronic delay device which delays all of the components of the electrical signal by the same amount. The resulting electrical signals from the first and second branches are mixed together by a mixer and provided to an integrator unit. The integrator averages, over time, the mixed signals, the averaging being performed for several values of the electronic delay. The resulting averaged signal is an indicator of WDM channel parameters such, for example, as whether a particular channel is "on" or "off", the power level of a particular channel, and whether the wavelength of a particular channel has drifted.

In another embodiment, the optical signal in the second branch is delayed by an adjustable optical delay device which delays the wavelengths in the optical signal by a selected interval. The delayed signal is then converted to an electrical signal by an optical detector, mixed with the electrical signal of the first branch, and provided to the integrator.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
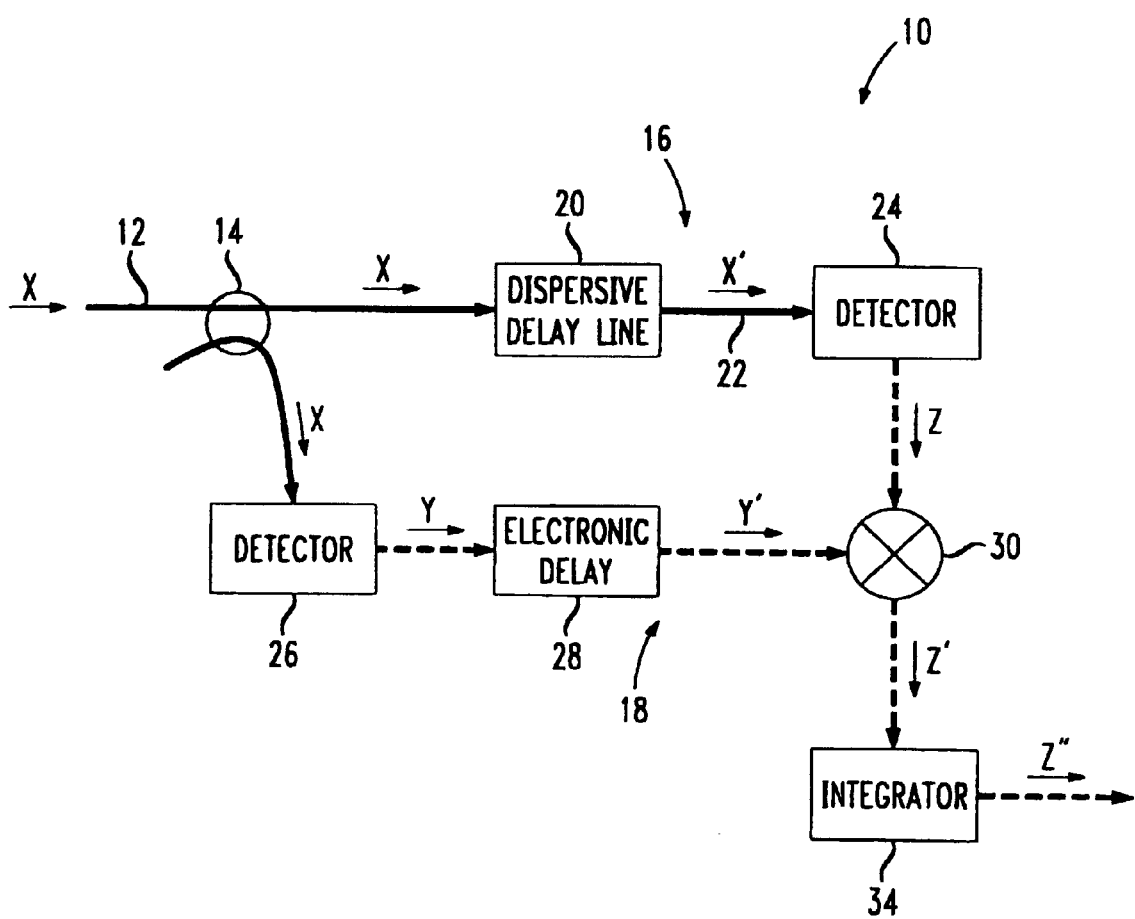
FIG. 1 is a block diagram of a monitoring device in accordance with the present invention.
Figure 3:
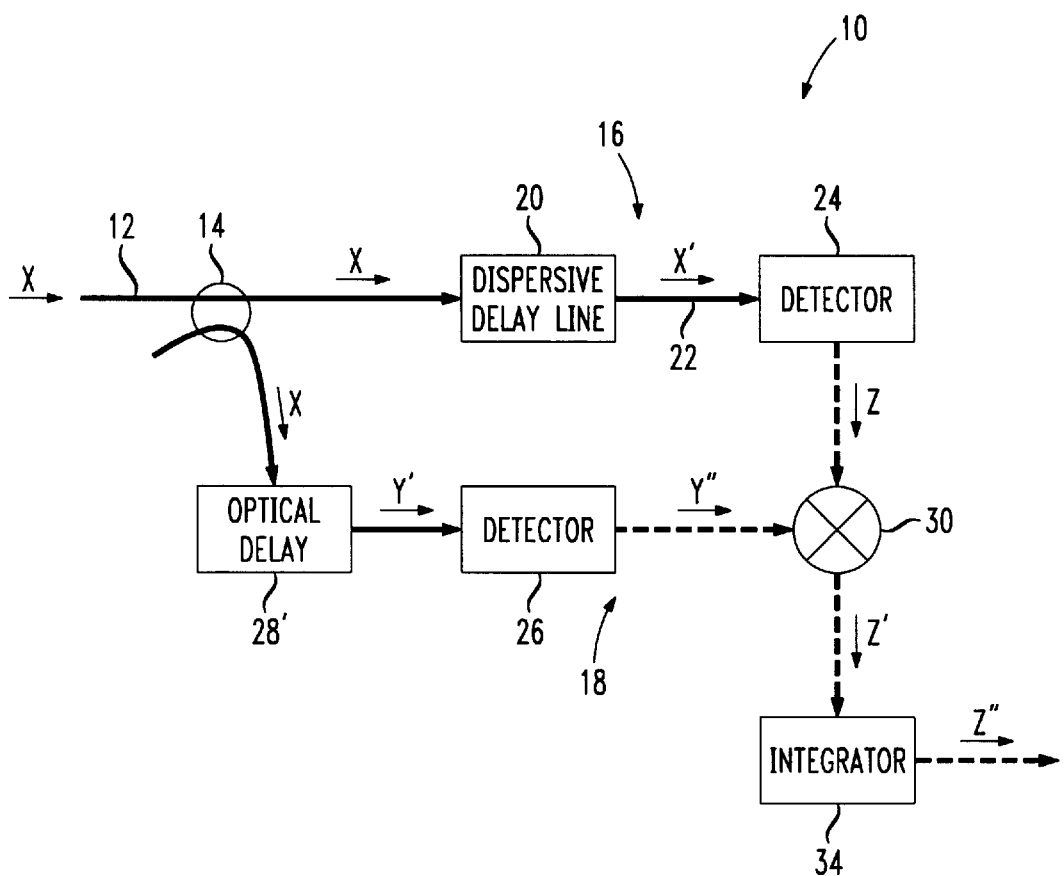
FIG. 3 is a block diagram of an alternate embodiment of the present invention.

With reference now to FIG. 1, a schematic representation of a system 10 of the invention for monitoring of data channels in a WDM optical signal X is there depicted. As shown, system 10 has an input optic fiber 12 for receiving an input WDM optical signal X having a plurality of discrete wavelengths or channels for carrying data bit streams through an optical medium. WDM optical signal X is obtained from a main fiber (not shown) of an optical communications system using any known means, such as by a coupler/splitter or router. Optical fiber connections in FIGS. 1 and 3 are illustrated as solid (unbroken) lines and electrical connections are illustrated as broken or dashed lines. For meaningful monitoring, system 10 requires a substantially uncorrelated optical signal. An uncorrelated signal is one wherein there is no constant repetition of data bits in specific optical channels, and wherein the identical sequence of data bits does not appear repetitively in more than one channel. For the purposes herein, WDM optical signal X is assumed to be a substantially uncorrelated optical signal.

As shown in FIG. 1, WDM signal X is divided by a coupler/splitter 14 into two portions, with each portion containing all of the wavelengths or channels. A first portion of signal X is provided to a first branch 16 and a second portion of signal X is provided to a second branch 18. First branch 16 has a dispersive delay line 20 and a photodetector 24. Dispersive delay line 20 includes a plurality of fiber gratings, one for each wavelength channel, for causing fixed temporal spacing or time shifting among the channels in the WDM signal X. In the alternative, the dispersive delay line 20 may be constructed from a length of optical waveguide or fiber which exhibits group velocity dispersion due to the material from which it is fabricated or due to the design of the waveguide. In the alternative, the dispersive delay line 20 may include a pair of devices, the first of which separates the individual wavelength from each other and the separated wavelengths are then passed through differing propagation distances and received by the second device for recombination. Also, the dispersive delay line may be constructed from a series of concatenated optical elements, each having differing propagation distances from each other for reflecting discrete wavelengths and producing a different transit time for each wavelength.

The dispersive delay line 20 is designed to produce a desired time shift, i.e. the gratings are selected to impart a resultant time shift to the wavelengths so that the wavelengths are equally spaced in time by the amount of the time shift for producing a staggered optical signal. For example, if a dispersive delay line is designed having a 1 ns shift, a signal output from the dispersive delay line will have channel spacings of 1 ns so that the spacing between channels 1 and 2 will be 1 ns, the spacings between channels 1 and 3 will be 2 ns, etc. The output of dispersive delay line 20 is shown as X'. Since optical signal X is substantially uncorrelated, at time t=0, for example, a first bit of a first channel in signal X may be aligned with a tenth bit of a second channel. After processing by the dispersive delay line 26, the bits will be re-aligned or shifted so that, to continue with the same example, a second bit of the first channel will be aligned with the eleventh bit of the second channel. This description is only for illustrative purposes. Input bits need not be bit aligned, nor does the shift between channels imposed by the dispersive delay line need to be in increments of bit periods. It is also not necessary that the differential delay imposed between a given pair of channels be the same as for other channels, so long as the differential delay is a known quantity.

The shifted optical signal X' is output from the dispersive delay line 20 onto a fiber 22 and is then provided to an optical detector 24 for converting the time-shifted optical signal X' into a time-shifted electrical signal Z. As explained more fully below, the time-shifted electrical signal Z is then input to an RF mixer 30.

The second branch 18 of system 10 includes an optical detector 26 and an electronic delay 28. Detector 26 converts the second portion of optical signal X into an electric signal Y, which is then processed by the electronic delay 28 to produce a delayed electrical signal Y'. Electronic delay 28 is an electronic delay device, as is known by those having ordinary skill in the art, having an adjustable delay interval which delays all of the wavelengths in signal Y by the same time delay interval. The delayed signal Y' is provided to the mixer 30 for mixing with signal Z to produce a resulting signal Z'. The time delay increment of electronic delay 28 is adjusted to be less than the shortest bit period of any of the channels in the optical signal X. In other words, if the bit period of a first optical channel is the smallest period of all of the channels in the signal X, then the electronic delay increment will be adjusted to be smaller than that bit period.

By adjusting the electronic delay interval in this manner, the electronic delay interval will equal the optical delay amount for one of the channels in the optical signal X. When this occurs, signal Z' will have a particular non-zero value. By taking numerous measurements of optical signal X in the manner described above for different electronic time delay intervals, and by providing the resulting signals Z' to an integrator 34 for averaging the values of Z' and producing an averaged output value Z", monitoring of the numerous channels in signal X can be accomplished to determine, for example, which channels are "off", which wavelengths have drifted, and the power levels for particular channels.

Figure 2A:
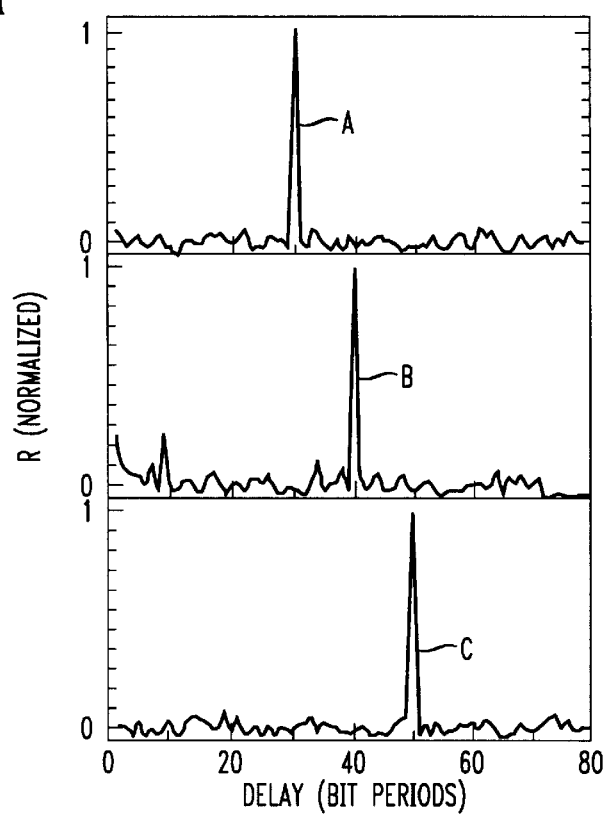
FIGS. 2A and 2B are graphical representations, by way of illustrative example, of channels monitored by the monitoring device of FIG. 1.
Figure 2B:
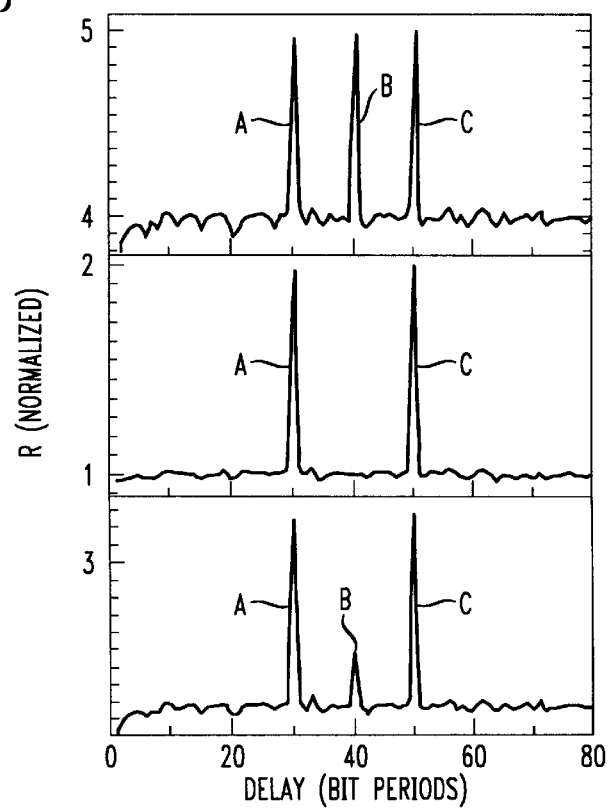

FIGS. 2A and 2B depict a graphical representation of the operational results of system 10. The ordinate of these graphical representations is the signal Z" and the abscissa is delay in units of the bit period of the data in the channels of signal X. As shown by way of illustrative example, a channel is present at electronic delay bit periods of 30, 40 and 50, respectively. In particular, the uppermost graph in FIG. 2A shows the value of Z" for a single channel (channel A) WDM signal X at an electronic delay bit period of 30; the middle graph shows the value of R for a single channel (channel B) WDM signal X at an electronic delay bit period of 40, and the bottom graph shows the value R for a single channel (channel C) WDM signal X for an electronic delay bit period of 50. By adjusting the electronic delay interval for a WDM signal, the delay locations of the channels in the WDM signal can be located and used for later analysis.

Using the data presented in FIG. 2A it is possible to calibrate the monitoring scheme to determine the value of electrical delay at which each wavelength channel results in a correlation peak. As the amplitudes of the signals is known, it is also possible to calibrate the height of the peak in terms of input optical power on the corresponding wavelength channel. With reference now to FIG. 2B, the calibration can be used to determine the correspondence between a correlation trace and the input signal. In the upper panel, three equal peaks are present at locations corresponding to the peaks observed in FIG. 2A. From this it can be determined that all three channels are turned on and have equal amplitudes. In the middle panel, one channel (channel B) is absent or off. Thus, knowing the location of channel B, i.e., at what value of electrical delay channel B occurs, it can be determined that there is no optical signal at the wavelength assigned to channel B. Likewise, the bottom panel of FIG. 2B shows channel B having a reduced amplitude as compared to the other channels, indicating that channel B has reduced optical power level, which may be corrected by adjusting a corresponding signal laser, for example.

With reference now to FIG. 3, an alternative embodiment of the present invention is there depicted. As shown in FIG. 3, instead of the FIG. 1 arrangement in which detector 26 receives the optical signal X and converts the optical signal to an electric signal Y that is then provided to an electronic delay unit 28, the optical signal X from coupler/splitter 14 is first received in second branch 18 by a variable optical delay 28', of a type known by those having ordinary skill in the art, for delaying all wavelengths or channels in the optical signal X by the same amount, e.g. by the same time interval. The optical delay 28' outputs the delayed optical signal Y' to the detector 26 for converting the delayed optical signal Y' to an electrical signal Y" which is then provided to mixer 30 for mixing with signal Z in the manner set forth above. In a further modification, the dispersive delay line 20 may be constructed of chirped wavelength gratings so that the resulting output signal Z" can be used to detect wavelength shift. For example, if chirped gratings are used, the reflection position of each wavelength off of each corresponding grating can change due to small changes in wavelength. Thus, the reflection position of each wavelength from each corresponding grating can vary from reflecting off a front edge of a particular grating, to reflecting off a back edge of a particular grating. This shift of reflection position translates into slight time shifts in the dispersive delay signal X' and can be used to fine-tune signal lasers used by an optical communication system so that optical power is provided at appropriate wavelengths.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A device for monitoring a WDM optical signal having a plurality of discrete wavelengths carrying uncorrelated data signals through an optical fiber, said device comprising:
   a splitter for receiving the WDM optical signal and dividing the signal into first and second portions so that each of said first and second portions contains the plurality of discrete wavelengths;
   a dispersive delay line for receiving said first portion such that each wavelength in said first portion experiences a different and unique transit time thereby generating a staggered optical signal such that the plural discrete wavelengths are staggered in time;
   optic detection means for receiving said staggered optical signal and for producing a first electrical signal from said staggered optical signal;
   means for generating a plurality of delayed electrical signals from the second portion, wherein each delayed electrical signal in said plurality contains components corresponding to the plural discrete wavelengths in the WDM optical signal;
   a mixer for mixing some of the delayed electrical signals with said first electrical signal to produce a plurality of resulting electrical signals; and
   an integrator for averaging the plurality of resulting electrical signals to generate and output signal indicative of characteristics of the plural discrete wavelengths of the WDM optical signal.

2. The device of claim 1, wherein said generating means comprises an optical detector for receiving said second equal portion and for producing an electrical signal, and an electronic delay having an adjustable time delay interval for receiving the electrical signal from said optical detector and for dynamically delaying frequencies in the electrical signal by the time delay interval for producing the plurality of delayed electric signals, with each delayed signal in the plurality corresponding to a time delay interval of said electronic delay.

3. The device of claim 1, wherein said dispersive delay line comprises a plurality of fiber-optic gratings each reflecting a corresponding wavelength of the discrete wavelengths.

4. The device of claim 3, wherein said plural fiber-optic gratings comprise chirped fiber-optic gratings.

5. The device of claim 1, wherein the uncorrelated data signals have data bit periods and wherein the delayed second electrical signals are produced by said electronic delay by adjusting the time delay interval of said electronic delay to intervals smaller than the data bit periods.

6. The device of claim 1, wherein said generating means comprises an optical delay unit having an adjustable time delay interval for receiving the second portion and for dynamically delaying wavelengths in the second portion by the delay interval for producing, for each delay interval, a delayed second optical signal, and an optical detector for converting the delayed second optical signals into the plurality of delayed electrical signals.

7. The device of claim 6, wherein said dispersive delay line comprises a plurality of fiber-optic gratings each reflecting a corresponding wavelength of the discrete wavelengths.

8. The device of claim 7, wherein said plural fiber-optic gratings comprise chirped fiber-optic gratings.

9. The device of claim 6, wherein the uncorrelated data signals have data bit periods and wherein the delayed electrical signals are produced by said optical delay unit by adjusting the time delay interval of said optical delay unit to intervals smaller than the data bit periods.

10. The device of claim 1, wherein said dispersive delay line comprises a length of optical waveguide which exhibits group velocity dispersion due to one of the material from which it is fabricated and the design of the waveguide.

11. The device of claim 1, wherein said dispersive delay line comprises a first and second device. Said first device separating the individual wavelength from the plurality of discrete wavelengths, which are then passed through differing propagation distances and received by said second device for recombination.

12. The device of claim 1, wherein said dispersive delay line comprises a series of concatenated optical elements, each of which having differing propagation distances from each other for reflecting a single wavelength of the plurality of discrete wavelengths for producing a different transit time for each wavelength.

13. A method for monitoring a WDM optical signal having a plurality of discrete wavelengths carrying uncorrelated data signals through an optical fiber, with each data signal having a corresponding data bit period, comprising the steps of:
   dividing the WDM optical signal into first and second portions so that each of said first and second portions contains the plurality of discrete wavelengths;
   delaying the plurality of discrete wavelengths in the first portion by a time delay period that is unique for each wavelength to generate a staggered optical signal having temporal spacings of the time delay period between the plural discrete wavelengths of the staggered optical signal;
   converting the staggered optical signal into a first electrical signal and the second portion into a second electrical signal;

adjustably delaying the second electrical signal for several delay intervals which are smaller than the data bit periods of the uncorrelated data signals for producing, for each delay interval, a delayed second electrical signal;

mixing some of the delayed second electrical signals with the first electrical signal to produce a plurality of resulting electrical signals; and averaging the plurality of resulting electrical signals to obtain an output signal indicative of characteristics of the discrete wavelengths.

14. The method of claim 13, wherein said step of delaying the plurality of discrete wavelengths to generate a staggered optical signal further comprises providing the first portion to a plurality of optical gratings, with each grating receiving a corresponding wavelength of the plurality of discrete wavelengths.

15. The method of claim 14, wherein said plural optical gratings comprise chirped optical gratings.

16. The device of claim 13, wherein said dispersive delay line comprises a length of optical waveguide which exhibits group velocity dispersion due to one of the material from which it is fabricated and the design of the waveguide.

17. The device of claim 13, wherein said dispersive delay line comprises a first and second device. Said first device separating the individual wavelength from the plurality of discrete wavelengths, which are then passed through differing propagation distances and received by said second device for recombination.

18. The device of claim 13, wherein said dispersive delay line comprises a series of concatenated optical elements, each of which having differing propagation distances from each other for reflecting a single wavelength of the plurality of discrete wavelengths for producing a different transit time for each wavelength.

* * * * *